INVENTOR
WILHELM HAMMER

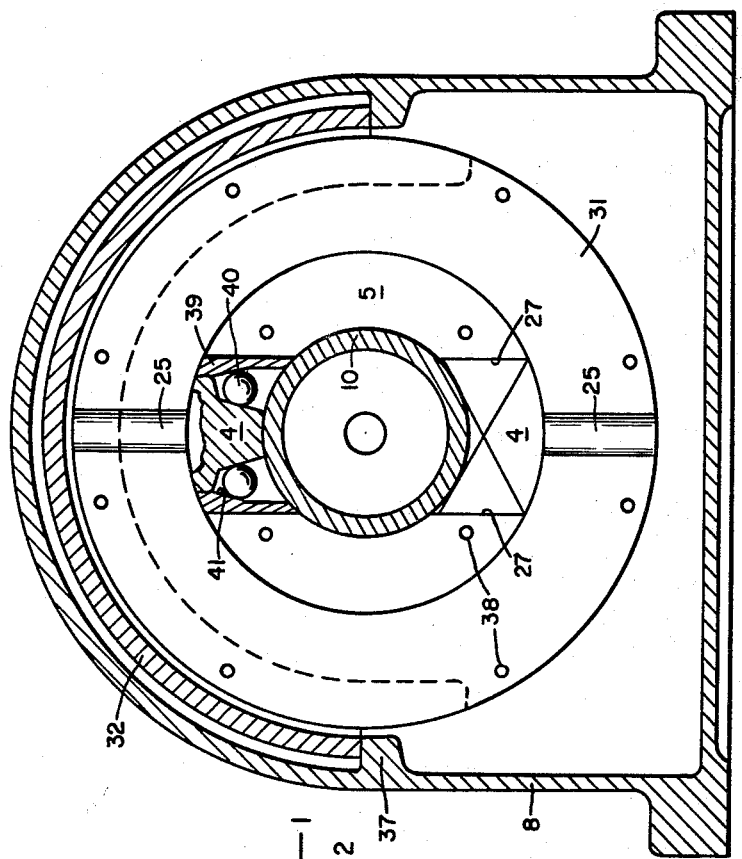
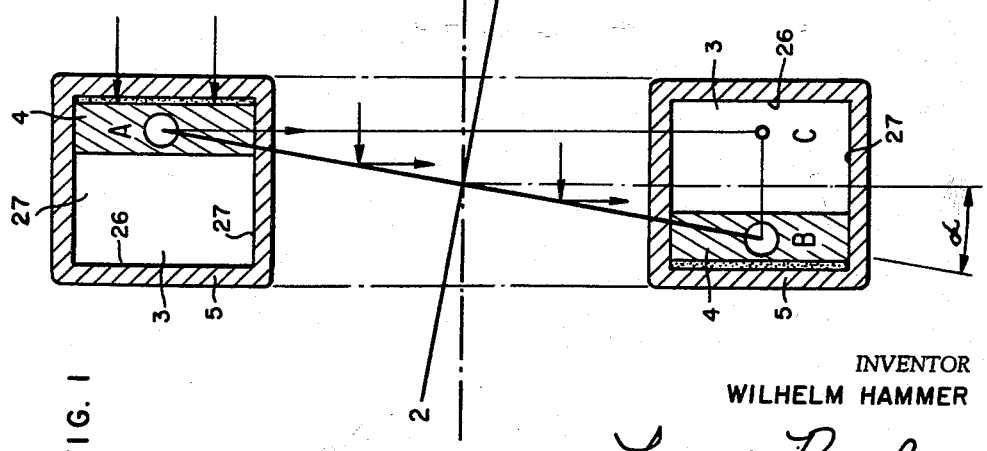

April 6, 1965  W. HAMMER  3,176,667
PISTON ENGINE
Filed Oct. 22, 1962  3 Sheets-Sheet 3
FIG. 4
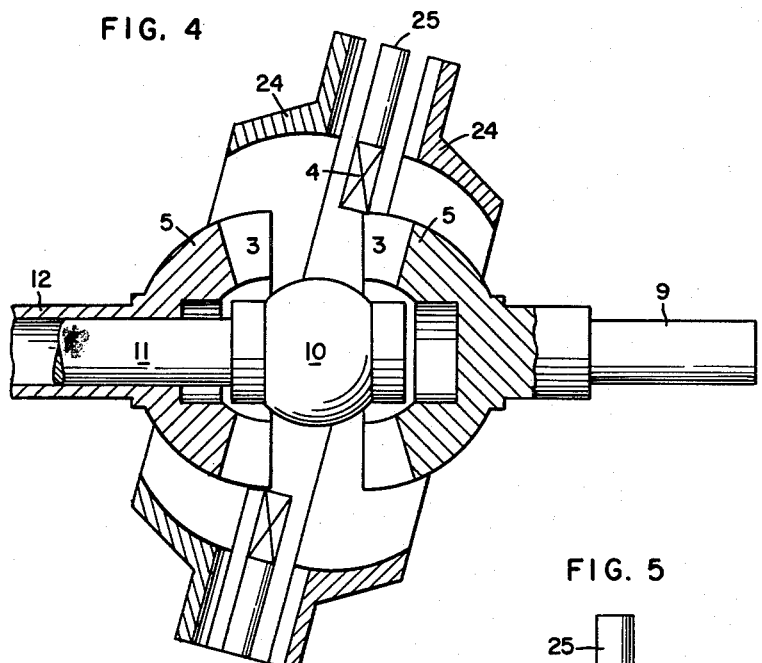
FIG. 5
FIG. 6
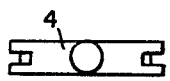
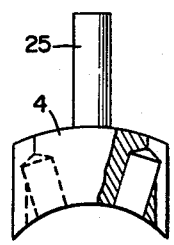
FIG. 7
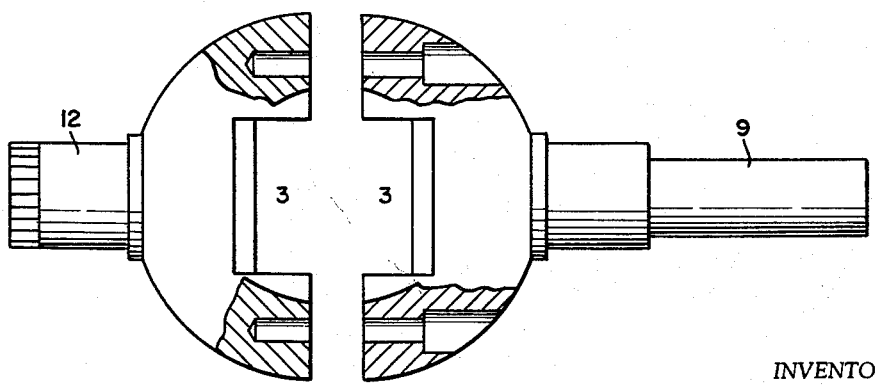
INVENTOR
WILHELM HAMMER
BY Lowry & Rinehart
ATTORNEYS

3,176,667
PISTON ENGINE
Wilhelm Hammer, 13 Sandrartstrasse,
Ingolstadt, Germany
Filed Oct. 22, 1962, Ser. No. 232,152
11 Claims. (Cl. 123—43)

This invention relates to piston engines, and more specifically to a piston engine which is adapted to work as an internal combustion engine and also as a pump.

The invention provides a piston engine, wherein a spatially fixed, rotatable support is constituted by a path of rotation of at least one piston enclosed in a piston chamber provided in a rotatable casing structure, the path of rotation of said piston is inclined in relation to the axis of rotation of said piston chamber, and said piston when driven in the direction of the axis of rotation of said piston chamber is adapted to force the rotation of said casing structure against said support in a spherical arrangement.

According to a preferred form of construction at least two diametrically opposite piston chambers are formed by the hollow space located between two hollow members with spherical surfaces rotatable about axes arranged at an angle in relation to each other and by side walls which are formed by radial openings in a wall of a first hollow member with a spherical surface, a second hollow member with a spherical surface is arranged in said first hollow member and forms the inner spherical surface of the piston chambers, both hollow members being rotatable about the same axis but at different speeds, and the pistons are rotatably mounted by means of piston pins in a piston carrier forming the outer spherical surface of the piston chambers and are slidingly supported on the outer surface of said second hollow member, the longitudinal axis of said piston pin forming with the axis of rotation of said second hollow member an angle varying from 90 degrees.

The novel piston engine may also be realized with a single piston in a single piston chamber.

A preferred embodiment of the invention will now be described by way of example and with reference of the accompanying drawings, in which:

FIG. 1 is a schematic illustration of the principle of operation of a piston engine according to the invention;

Figure 2:
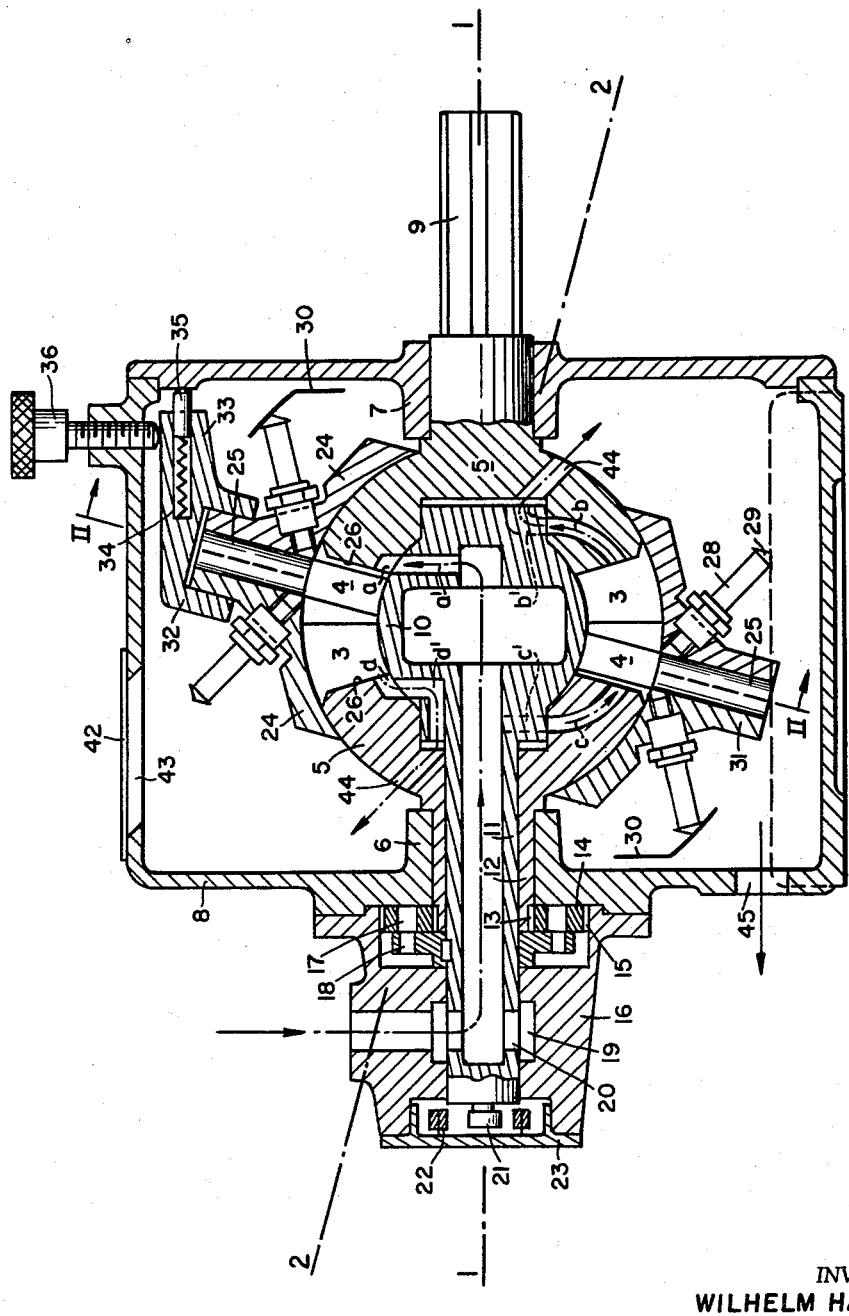
FIG. 2 is a longitudinal section through the piston engine.

FIG. 3 is a cross section through the piston engine taken on the line II—II of FIG. 2, FIG. 4 is a sectional exploded view of the inner mechanism of FIG. 2, showing the hollow members with the spherical surfaces, FIG. 5 is a side view, partly in section, of one of the pistons, FIG. 6 is a top view of the piston, and FIG. 7 is a fragmentary exploded view, partly in section, of the piston chamber carrier.

FIG 1 illustrates the principle of operation of a piston engine according to the invention. A piston chamber carrier 5 is arranged for rotation about an axis 1—1, whereas pistons 4, each carried by a piston carrier 24 (FIG. 2) and guided in piston chambers 3 in the piston chamber carrier 5 are rotatable about an axis 2—2 arranged at an angle in relation to the axis 1—1 and describe an ellipse about the axis 1—1 when in rotation. The axes 1—1 and 2—2 extend in the same plane and intersect in a point which is the centre of the piston chamber carrier 5 and the piston carrier 24, so that a spatially determined path of rotation A–B is established for the pistons 4, A being the upper and B the lower dead centre on this path. The piston chambers 3 in the piston chamber carrier 5 will move about the axis 1—1 along a path of rotation A–C. The piston stroke is designated by B–C and the angle of stroke by α.

If by the ignition of a compressed gas mixture, shortly after the piston 4 enclosed in its chamber 3 has passed one of the dead centres A and B, the piston 4 is driven in the direction of the axis 1—1, as indicated by arrows, and towards the inclined path of rotation A–B, it can shift only into the open angle of stroke α and is thus compelled to drive itself about the axis 2—2, and its associated chamber 3 about the axis 1—1.

This principle is similar to that utilized in rocket motors, as the combustion gases will not act upon a part fixed in space but on the rotating piston chamber carrier 5, and, as two pistons 4 will move at the same time in three different directions, it is obvious that this principle can be realized in a spherical arrangement only. It is, of course, possible to provide but one piston chamber with but one piston or also several radially arranged piston chambers. Expediently, however, provision is made of two diametrically opposite piston chambers with associated pistons.

As can be seen from FIG. 2, the piston chamber carrier 5 consists of a two-part hollow member and is rotatably mounted in hub flanges 6 and 7 of a housing 8. The piston chamber carrier 5 has a driven shaft 9 and opposite thereto a hollow bearing shaft 12.

The piston chamber carrier 5 accommodates a hollow member 10 which is rotatably mounted therein by means of a hollow shaft 11 extending through the hollow bearing shaft 12 of the piston chamber carrier 5, and by means of two cylindrical reinforcements on either side of its centre.

The hollow member 10 is arranged for rotation at a speed which differs from that of the piston chamber carrier 5, preferably at a ratio of 1:2. This reduction in speed is obtained by means of a planetary gearing consisting of a toothing 13 on the end portion of the hollow bearing shaft 12, planetary gears 14 and an internally toothed rim 15 provided on a bearing bracket 16 flanged to the housing 8.

The planetary gears 14 are rotatable about pin 17 provided on a disk 18 which is connected to the hollow shaft 11 of the hollow member 10.

The end of the hollow shaft 11 carries a make-and-break cam 21 for co-operation in a known manner with ignition control levers 22 which are tiltably supported in an adjustable distributing cap 23 of the bearing bracket 16. It is obvious that the cam 21 will rotate at the same speed as the hollow member 10.

The end of the hollow shaft 11 is supported in the bearing bracket 16 through which the medium to be sucked in can pass via an annular channel 19 into the hollow shaft 11 through openings 20 provided therein and further into the hollow member 10.

The piston chamber carrier 5 containing the piston chambers 3 is partially spherically enclosed by the piston carrier 24 which consists of two hollow shells.

The pistons 4 are carried by cylindrical piston pins 25 which are rotatably mounted in the piston carrier 24. The inner end walls of the pistons 4 are slidingly supported on the hollow member 10.

As can be seen especially from FIG. 1, the piston chambers 3 and the pistons 4 movable therein are of rectangular cross section. The piston chambers 3 are defined by the hollow member 10 and the hollow piston carrier 24 as well as by straight side walls 26 and 27 of the piston chamber carrier 5. Sparking plugs 28 are screwed into the side walls of the piston carrier 24 and project into the combustion chambers. The sparking plugs carry contact caps 29 adapted to take the ignition current from contact springs 30 while sliding therealong. The contact springs 30 are arranged for electrical co-operation with the ignition control levers 22 through the intermediary of ignition contacts, not shown, on the distributing cap 23.

The connected flanges of the two hollow shells of the piston carrier 24 form a tread rim 31 which is arranged to run in a bearing bracket 32 of inverted U shape in cross section. The bearing bracket 32 has a horn 33 accommodating a pin 35 which bears under the action of a spring 34 against the housing 8. The horn 33 is maintained and adjustable in its position by means of a setscrew 36 provided in the housing 8. The setscrew 36 determines the direction of the axis 2—2 and thus the stroke of the pistons 4. Thereby it is possible to adapt the compression ratio of the gas mixture to the octane number of the fuel used or, in the case of a pump or a compressor, respectively, to vary the delivery. As the forces exerted by the pistons 4 are always directed towards the setscrew 36, the spring 34 provides sufficient counterpressure.

As illustrated in FIG. 3, the bearing bracket 32 is tiltably supported on shoulders 37 on the housing 8. The two-part piston chamber carrier 5 and the two hollow shells of the piston carrier 24 are screwed together by means of screws 38.

The pistons 4 are sealed in their chambers 3 by means of straps 39 inserted in longitudinal grooves in the lateral edges of the pistons 4 and provided with bevels 41. Balls 40 are arranged in the pistons 4 in such a manner that during rotation of the pistons 4 they will be pressed by the developing centrifugal force against the bevels 41 on the straps 39 thereby to urge the straps sealingly against the side walls 27 of the piston chambers 3.

The sparking plugs 28 are accessible through an opening 43 in the housing 8, which is closed by a cover 42.

The piston chamber carrier 5 is provided with compartments $a$, $b$, $c$ and $d$ which are parts of the piston chambers 3 and together with the compression chambers thereof form the combustion chambers. The hollow member 10 is provided in its reinforced portions with channels $a^1$, $b^1$, $c^1$ and $d^1$. The channels $a^1$ and $c^1$ communicate with the intake side of the medium and the channels $b^1$ and $d^1$ with the exhaust side of the medium through the intermediary of ducts 44 provided in the piston chamber carrier 5.

Because of the reduced speed of the hollow member 10 relative to the piston chamber carrier 5, the compartments $a$, $b$, $c$ and $d$ will operate in a known four-stroke cycle in the following sequence:

| | 1/2 revolution | 2/2 revolutions | 3/2 revolutions | 4/2 revolutions |
|---|---|---|---|---|
| Compartment $a$ | Suction | Compression | Combustion | Exhaust |
| Compartment $b$ | Compression | Combustion | Exhaust | Suction |
| Compartment $c$ | Combustion | Exhaust | Suction | Compression |
| Compartment $d$ | Exhaust | Suction | Compression | Combustion |

According to this cycle sequence, at the first and third half-revolution compression takes place on the front side of the piston with simultaneous combustion on the rear side thereof. At the second and fourth half-revolution compression and combustion are diametrically opposite to each other. As a result, the axial forces acting on the piston chamber carrier 5 and the piston carrier 24 are almost entirely neutralized.

All movable parts of the machine are diametrically opposite to each other in pairs so that no imbalance may be caused even in case of variation of the stroke.

The cycle sequence shows that combustion takes place in each compartment at every second revolution. As there are four compartments it is obvious that there will be two combustions at each revolution as opposed to one combustion at every second revolution in a standard four-stroke engine. Thus it is possible to speak of a quadruple four-stroke cycle in the case of the novel engine.

The mode of operation corresponds to that of a standard four-stroke internal combustion engine. The flow of the medium is controlled by the hollow member 10 instead of by the usual valves. The engine is driven by the controlled combustion of the gas mixture in the compartment $a$ and each subsequent compartment $b$, $c$ and $d$.

The medium or the exhaust gases, respectively, will pass through the ducts 44 into the free inner space of the housing 8 and escape through an outlet 45 provided in a wall thereof.

The most progressive technical feature of the novel engine consists in that crank shaft, connecting rods, valves and camshaft are completely eliminated.

The engine may also be used as a rotary pump, an air compressor or a hydraulic change-speed gear.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A piston engine comprising a casing, first and second bellow members having spherical surfaces arranged one within the other, at least two diametrically opposite piston chambers defined by spherical surfaces of said first and second hollow members, a piston in each chamber, means defining a path of rotation of said pistons inclined relative to the axis of rotation of said piston chambers, and said piston chambers further including straight side walls located paraxially in relation to each other and defining guides for said pistons.

2. The piston engine as defined in claim 1 including means for variably adjusting the inclination of the axis of the path of rotation of said pistons.

3. The piston engine as defined in claim 2 including a piston carrier surrounding one of said spherical surfaces, each of said pistons having generally flat top portions from which project piston pins, and means rotatably mounting said piston pins in said piston carrier.

4. The piston engine as defined in claim 3 wherein means is provided for transmitting torque from each of said pistons to said piston carrier.

5. The piston engine as defined in claim 4 wherein means is provided for rotating one of said hollow members at a speed different from the speed of the piston chambers.

6. The piston engine as defined in claim 5 wherein said last mentioned means includes planetary gears driven by the outer one of said hollow members.

7. The piston engine as defined in claim 6 wherein said pistons are mounted for sliding movement on the spherical surface of the innermost one of said hollow members, and oscillate with the piston carrier relative to the spherical surface of the outermost one of said hollow members.

8. The piston engine as defined in claim 7 wherein said innermost one of said hollow members includes means for introducing medium into and withdrawing medium from said piston chambers.

9. The piston engine as defined in claim 8 wherein said innermost hollow member includes a shaft carrying a make-and-break cam for regulating timed ignition of said piston chambers.

10. The piston engine as defined in claim 9 wherein said piston chambers are located at symmetrical angles relative to each other whereby combustion and compression takes place in diametrically opposite piston chambers.

11. The piston engine as defined in claim 10 wherein sealing straps are provided for sealing said pistons, and ball means is positioned to subject said straps to the action of centrifugal forces.

References Cited by the Examiner

UNITED STATES PATENTS

| | | | |
|---|---|---|---|
| 953,868 | 4/10 | Tcherepanoff | 123—18 |
| 1,733,965 | 10/29 | Howard | 123—43 |
| 3,075,506 | 1/63 | Berry | 123—43 |

FOREIGN PATENTS 103,650  4/38  Australia.

FRED E. ENGELTHALER, *Primary Examiner.*

SAMUEL LEVINE, *Examiner.*